E. LINDNER.
Shell.
No. 1,410. Reissued Feb. 17, 1863.
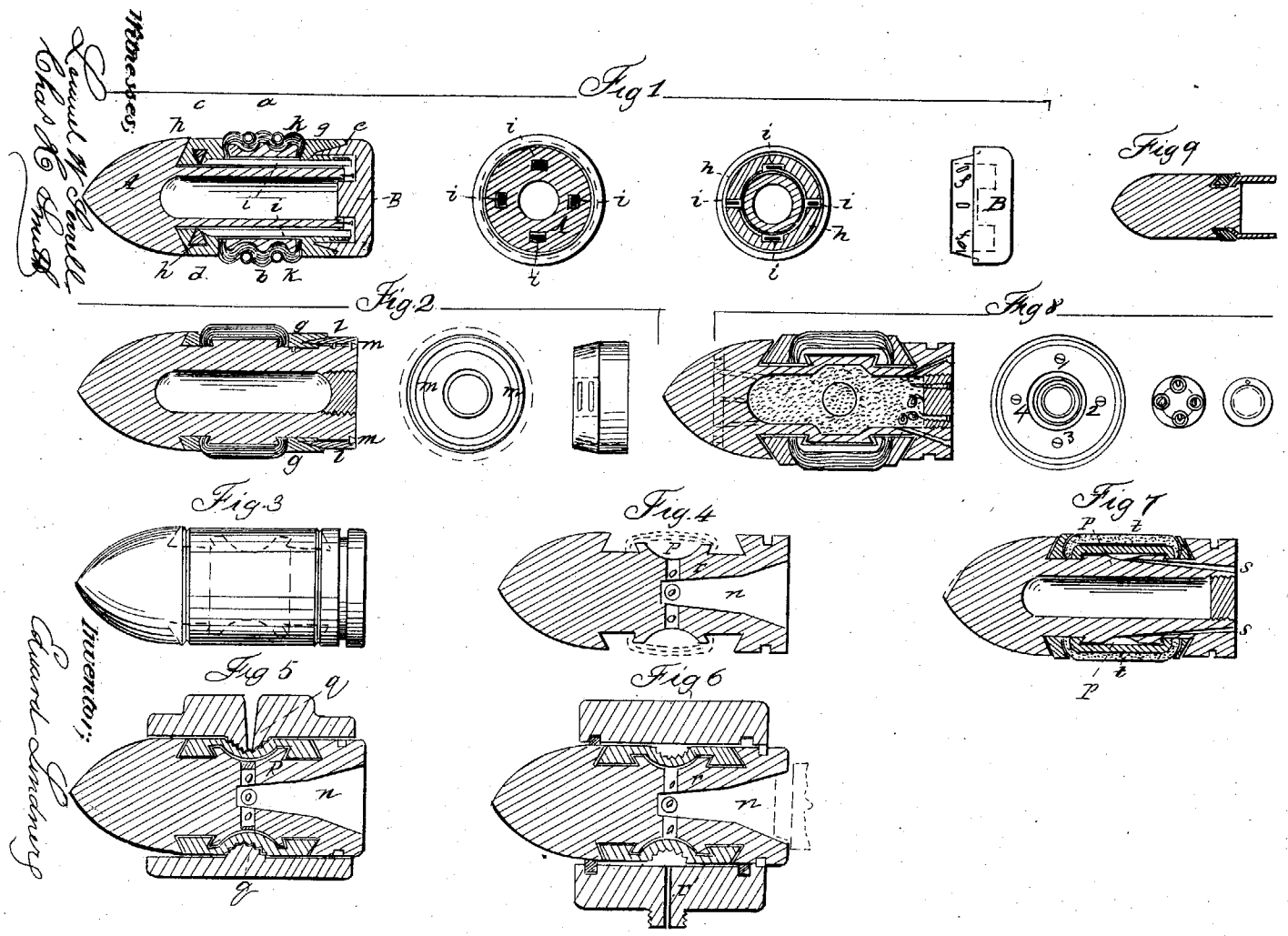
N. PETERS, PHOTO-LITHOGRAPHER, WASHINGTON, D. C.

UNITED STATES PATENT OFFICE.

EDWARD LINDNER, OF NEW YORK, N. Y.

IMPROVEMENT IN BANDING PROJECTILES FOR RIFLED ORDNANCE.

*Specification forming part of Letters Patent No.* 32,949, *dated July* 30, 1861; *reissue No.* 1,410, *dated February* 17, 1863.

DIVISION A.

*To all whom it may concern:*

Be it known that I, EDWARD LINDNER, of New York, in the county of New York and State of New York, have invented certain new and useful Improvements in Projectiles for Rifled Ordnance; and I do hereby declare that the following, taken in connection with the accompanying drawing, which forms part of this specification, is such a full and clear description as to enable others skilled in the art to which this my invention pertains to make and use the same.

My invention, in one or other of its forms, is applicable to projectiles, whether of solid or shell formation. It will be best explained by reference to the accompanying drawing, in which—

Figure 1 represents longitudinal and transverse sections, the latter taken as indicated by the lines *a b* and *c d*, and side view of the back or bottom of a projectile of what may be termed solid formation, in contradistinction to one designed to receive explosive material within it.

In said figure, A is the conical pointed shot or shot-body, cast of a reduced diameter from its point or front end toward the rear, and preferably of semi-dovetail configuration at its junction of the main or rear portion with the front end. B is a loose back or bottom, fitting into and over the rear portion of the body, with freedom to slide inward. This bottom B is constructed with an overlapping and forwardly-projecting wedge-shaped flange, *e*, which is, or may be, provided with apertures *f*, to aid in locking the movable bottom with a molten-lead packing, *g*, which is poured into or round the reduced portion of the cast body, and round the wedge-shaped flange of the movable bottom, and that is thus made to constitute a portion of the body of the projectile.

Prior, however, to filling round the body with the molten lead, which is firmly held in its place by the configuration given to the cast body and movable bottom of the projectile, there is arranged within the space designed to be filled with or covered by the lead a divided or expanded ring, *h*, made to surround the cast body near the forward end of its reduced diameter, and preferably with sloping edges or sides. In or round said space there are also arranged, longitudinally of the projectile, a series of bevel or wedge pointed bars, *i*, that, when pushed forward, may fit into notches or openings in the divided ring, and which extend backward so as to touch, or nearly touch, the movable bottom B. A woven or knit intermediate packing, K, surrounded or not by wire, and resting on or lapped round a suitable base, that may be formed by a proper shaped swell round the reduced portion of the cast body, and through which the wedge-pointed bars *i* pass, may also be provided on the projectile.

The operation of a projectile so constructed is obvious. The explosion of the powder in the cannon causes the back or movable bottom B to be driven inward or forward; and said bottom, by its wedge-shaped flange and action against the wedge-pointed bars, and through them against the divided ring, expands, at or near either end, circumferentially, the molten-lead packing, which is accordingly made to enter or fill the groove or grooves of the rifled ordnance as the projectile is shot out of it, the importance of which is well understood. The intermediate woven packing serves to establish a close or retaining fit of the projectile before firing, and to prevent escape of gas in and to clean the gun while firing.

Fig. 2 of the accompanying drawing shows a longitudinal section, back view and side view, of part of a similar projectile, made with a longitudinal cavity within it, but without a movable bottom, or with its back end closely plugged. In this arrangement the molten-lead packing *g* is acted upon in the rear, when the charge is exploded, by a wedge-shaped or expanding ring, *l*, made to freely surround the rear portion of the cast body, and which is urged forward by the explosion, as was the case with the movable bottom. To prevent the gases from penetrating and bursting said ring, a dovetailed packing, *m*, of molten lead or other suitable material, is provided between said ring and body, at their back ends, at the line of separation or division between them.

Figs. 3, 4, 5, and 6 illustrate the projectile and the mode of making the same, having an annular cavity between the cylindrical body *r* and the surrounding malleable packing, for the gases, when exploding, to press direct and equally on said packing to expand it.

In such arrangement the body of the projectile is formed with a cavity, *n*, open in the rear, and communicating, by branch openings *o*, with a groove or annular space, *p*, made in and round the body, at or about the middle of the packing-space, and across which groove may be stretched, as shown in dotted lines, Fig. 4, a woven packing; or such may be altogether omitted. To pack the projectile with its molten-lead wrapper, it may be placed in a mold or bore, as shown in Fig. 5, formed with an inwardly-projecting serrated swell or ring, *q*, over the annular groove *p* in the body, but leaving an intervening lead-space.

The branch openings *o* being temporarily plugged with felt, the molten lead is poured into the mold, so as to fill the packing-space of the projectile, including a lining to the annular space *p*. Such partly-finished projectile is then put into a cylindrical mold or box, as shown in Fig. 6, packed at or near the ends, and having no serrated projecting ring, *g*, but formed with an opening, *r'*, communicating from the outside with the annular space round the malleable packing, so that, by exhausting the air in any suitable manner from said annular space and admitting air, letting in steam or its equivalent to act from the inside of the projectile on the inside or back of the packing, or otherwise equivalently operating, and in which exhaustion of the air may be dispensed with, the molten lead is expanded and forced outward against the interior of the mold, and thereby the requisite form given to the packing and its compactness and tightness insured, while at the same time is established the annular groove or space *p* between the cast body and malleable packing for the gases, when exploding, to enter and press equally on the packing to expand it.

Fig. 3 shows an outside view of the projectile with its malleable packing or envelope applied, as described.

Fig. 7 represents a similar projectile, but with its back end closed up to form of it a shell-shot, and with chambers or channels, *s*, in the body of the metal, establishing communication of the annular space *p* with and through the rear for the gases, when exploding, to penetrate said groove or space. In this figure the malleable packing is shown conbined with a knit sleeve or woven packing, inserted in and made to rest for a base on the soft metallic packing across or over the annular gas-space *p*, so as, together with the metallic packing, to be expanded or forced outward by the explosion of the powder. A fire-proof cement is inserted between the metallic and woven packing to prevent injury to the latter on being fired, and when used without lead packing.

In this figure, too, the projectile is shown flattened or cut away at one side of its point, to offer, when projected from the rifled ordnance, and in its flight, a surface of resistance to the atmosphere, which will counteract the right-hand or sideward tendency which is incidental to the use of rifled cannon or ordnance, care only being taken, when loading the cannon, to insert the projectile so that, when discharged, it will leave the barrel with its flattened surface at the point next to or facing the side which the rifled barrel inclines the projectile to bear toward.

Fig. 8 represents views of a shell and its details, having exploding material within its body, and a bladder or ball containing hydrogen or other gas, also having a series of spiral tubes in the rear of the shell containing ignitible matter, and of different lengths, to act as fusees to explode the shell, either one of said fusees, according to the distance the shell is designed to be exploded at, being exposed to ignition by the powder in the gun, when discharged, by simply turning or setting back a covering-disk, having an aperture in it arranged so as to be brought over and expose any one of the fusees, but covering the others.

In conclusion, I would observe that the knit or woven packing is, previous to its being secured to the projectile, soaked in a solution of phosphate of ammonia, or of magnesia, or powdered as bestus in suspension in a gummy substance, in order to render it entirely fireproof.

What I claim as my invention, and desire to secure by Letters Patent, is—

1. The method, substantially as herein described, of applying the malleable envelope or packing, first by casting it around and against the annular cavity in the body of the projectile, and then expanding it by atmospheric or other pressure against the sides or interior surface of a finishing or forming mold or box.

2. The method of securing the knit sleeve in or around the body of the projectile, substantially as described.

In witness whereof I have hereunto set my signature this 26th day of January, 1863.

EDWARD LINDNER.

Witnesses:

LEMUEL W. SERRELL,
CHAS. H. SMITH.